(12) United States Patent
Su et al.

(10) Patent No.: US 11,290,306 B2
(45) Date of Patent: Mar. 29, 2022

(54) SIGNAL PROCESSING DEVICES AND SIGNAL PROCESSING METHODS

(71) Applicant: Realtek Semiconductor Corp., HsinChu (TW)

(72) Inventors: Chi-Hsi Su, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/022,015

(22) Filed: Sep. 15, 2020

(65) Prior Publication Data

US 2021/0226825 A1 Jul. 22, 2021

(30) Foreign Application Priority Data

Jan. 16, 2020 (TW) .................................. 109101550

(51) Int. Cl.
*H04L 25/03* (2006.01)

(52) U.S. Cl.
CPC .. *H04L 25/03057* (2013.01); *H04L 25/03159* (2013.01); *H04L 2025/03541* (2013.01)

(58) Field of Classification Search
CPC ................................................ H04L 25/03057
USPC ........................................................... 375/233
See application file for complete search history.

(56) References Cited

U.S. PATENT DOCUMENTS

| | | | | |
|---|---|---|---|---|
| 5,757,855 A | * | 5/1998 | Strolle | H04L 25/03267 375/262 |
| 6,744,814 B1 | * | 6/2004 | Blanksby | H04L 25/03235 375/229 |
| 8,861,663 B1 | | 10/2014 | Sedarat | |
| 9,838,072 B1 | * | 12/2017 | Dai | H04L 25/03885 |
| 2005/0122947 A1 | * | 6/2005 | Wang | H04L 25/03159 370/342 |
| 2007/0091995 A1 | | 4/2007 | Ibragimov | |

* cited by examiner

*Primary Examiner* — Lihong Yu
(74) *Attorney, Agent, or Firm* — Winston Hsu

(57) ABSTRACT

A signal processing device includes a decision feedback equalizer and a coefficient adjusting circuit. The decision feedback equalizer includes a first equalizer configured to perform filtering on a first signal according to a set of first coefficients to generate a first filtered signal. The set of first coefficients includes multiple first coefficients. The coefficient adjusting circuit is configured to adaptively adjust one or more of the first coefficients according to an error signal. A limit operation of the first coefficients is selectively performed. When the limit operation of the first coefficients is performed, at least one of the first coefficients is set to a first predetermined value to generate a set of limited first coefficients.

7 Claims, 10 Drawing Sheets

SIGNAL PROCESSING DEVICES AND SIGNAL PROCESSING METHODS

BACKGROUND OF THE INVENTION

1. Field of the Invention

The invention relates to a signal processing device in a communication device, more particular to a signal processing device capable of reducing influence of radio frequency (RF) interference on system performance.

2. Description of the Prior Art

A communication system usually includes communication devices such as the transmitter and the receiver. In the modulation procedure, the transmitter sets the voltage level of the signal, for example, one or more symbols, to be transmitted to the corresponding voltage level according to the content to be carried in the signal. The signal is then transmitted after some proper signal processing (for example, encoding, amplifying, etc.). The receiver is responsible for receiving the signal and processing the received signal. The receiver circuit usually includes a decision device, or called a slicer, for deciding the voltage level corresponding to the symbol transmitted by the transmitter. However, in most communication systems, the interference externally or internally generated, causes voltage shift in the transmission signal. For example, noise in the transmission channel may cause the voltage level of the transmission signal to deviate from the ideal voltage level (that is, the voltage level set by the transmitter), causing decision errors of the decision device.

In view of this, the communication devices are usually equipped with some circuits/devices to compensate for the influence of the channel effect on the signals. The compensation circuits or devices adaptively adjust or train the compensation associated parameters, so as to optimize the performance of channel effect compensation. However, the environment provided for training the parameters does not have the RF interference which actually exits in the real communication environment. Therefore, although the parameters can be adjusted or trained to the optimized values, when the receiver circuit starts to operate in real communication environment, the RF interference still affects the overall performance of the receiver circuit. For example, the RF front-end circuit and/or the compensation circuit or device usually amplifies the received signal first before performing subsequent signal processing. Due to the operation of amplification, the undesired RF interference is amplified as well. When the RF interference becomes too large after the amplification, the voltage shift of the desired signal also becomes too large and the excessive voltage shift causes misjudge of the receiver, resulting in communication performance degradation. If decision error or packet error continuously occur at the receiver side, it may eventually lead to serious consequences such as a disconnection between the transmitter and the receiver.

SUMMARY OF THE INVENTION

It is an objective of the invention to provide a signal processing method and associated signal processing device, so as to solve the problem of excessive RF interference. In the proposed signal processing method and associated signal processing device, by limiting the parameters of the equalizer in the frequency or time domain, the frequency response of the equalizer can be effectively weaken in a specific frequency range.

According to an embodiment of the invention, a signal processing device comprises a decision feedback equalizer and a coefficient adjusting circuit. The decision feedback equalizer comprises a first equalizer configured to perform filtering on a first signal according to a set of first coefficients to generate a first filtered signal. The set of first coefficients comprises multiple first coefficients. The coefficient adjusting circuit is configured to adaptively adjust one or more of the first coefficients according to an error signal. A limit operation of the first coefficients is selectively performed. When the limit operation of the first coefficients is performed, at least one of the first coefficients is set to a first predetermined value to generate a set of limited first coefficients.

According to another embodiment of the invention, a signal processing method comprises: adaptively adjusting a set of first coefficients of a first equalizer according to an error signal, wherein the set of first coefficients comprises a plurality of first coefficients; selectively performing a limit operation on the first coefficients according to a control signal after adaptively adjusting the set of first coefficients, wherein when the limit operation of the first coefficients is performed, at least one of the first coefficients is set to a first predetermined value to generate a set of limited first coefficients; and providing the set of first coefficients or the set of limited first coefficients to the first equalizer for the first equalizer to perform filtering according to the set of first coefficients or the set of limited first coefficients. The set of first coefficients and the set of limited first coefficients are coefficients of the first equalizer in time domain.

According to yet another embodiment of the invention, a signal processing method comprises: adaptively adjusting a set of first coefficients of a first equalizer according to an error signal, wherein the set of first coefficients comprises a plurality of first coefficients; and providing the set of first coefficients or a set of limited first coefficients to the first equalizer for the first equalizer to perform filtering according to the set of first coefficients or the set of limited first coefficients. The set of first coefficients and the set of limited first coefficients are coefficients of the first equalizer in frequency domain. The step of adaptively adjusting the set of first coefficients of the first equalizer according to the error signal further comprises: selectively performing a limit operation of the first coefficients according to a control signal. When the limit operation of the first coefficients is performed, at least one of the first coefficients is further adjusted according to a weakening factor and the set of limited first coefficients is generated.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
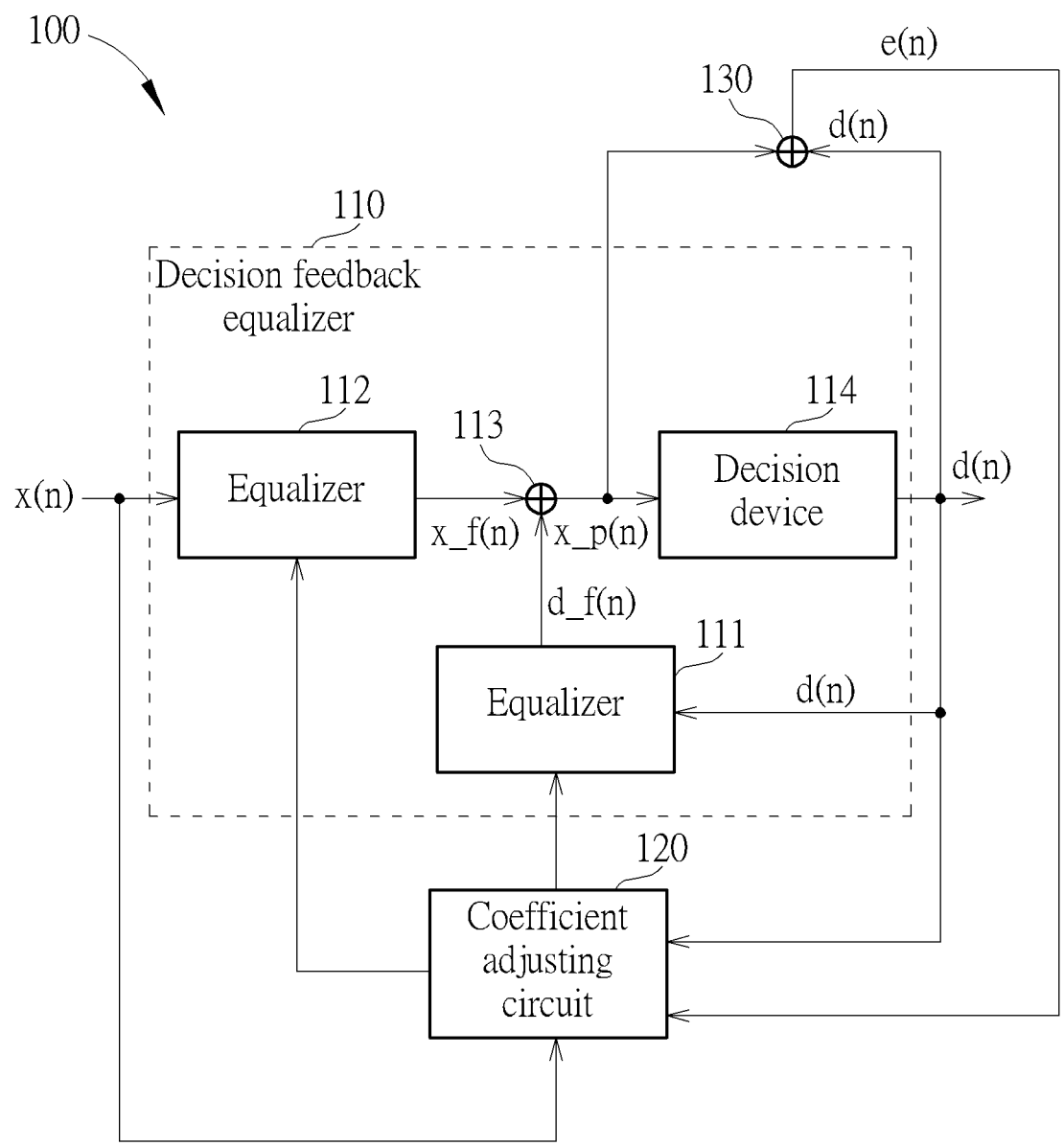
FIG. 1 is an exemplary block diagram of a signal processing device according to a first embodiment of the invention.

FIG. 1 is an exemplary block diagram of a signal processing device according to a first embodiment of the invention. The signal processing device 100 is applicable for a communication device, such as a receiver in a communication system, and is configured for processing the received signals. The signal processing device 100 may comprise a decision feedback equalizer 110 and a coefficient adjusting circuit 120. The decision feedback equalizer 110 may comprise equalizers 111 and 112, a combiner 113 and a decision device 114. The equalizer 111 is configured to perform filtering on the signal d(n) according to a set of first coefficients to generate the filtered signal d_f(n). The set of first coefficients comprises a plurality of first coefficients. The signal d(n) is an output signal (or called the decision signal) of the decision device 114. The equalizer 112 is configured to perform filtering on the signal x(n) according to a set of second coefficients to generate the filtered signal x_f(n). The set of second coefficients comprises a plurality of second coefficients. The signal x(n) is an input signal of the signal processing device 100, or, the received signal of the receiver.

The combiner 113 is coupled to the equalizers 111 and 112 and configured to combine the filtered signals x_f(n) and d_f(n) to generate the processed signal x_p(n). The decision device 114 may be a slicer configured to generate the decision signal d(n) according to the processed signal x_p(n).

The signal processing device 100 may further comprise another combiner 130 coupled to the combiner 113 and the decision device 114 and configured to combine the processed signal x_p(n) and the decision signal d(n), for example, by subtracting one from another, to generate the error signal e(n). The coefficient adjusting circuit 120 is configured to adaptively adjust one or more of the first coefficients or one or more of the second coefficients according to the error signal e(n), the decision signal d(n) and the signal x(n). The operations of adaptive coefficient adjustment performed by the coefficient adjusting circuit 120 are illustrated in the following equations Eq. (1) and Eq. (2):

$$c_i(n+1)=c_i(n)+\mu_c[x(n+i)e(n+i)], i=-(K-1), \ldots, 0, 1, \ldots N \quad \text{Eq. (1)}$$

$$b_j(n+1)=b_j(n)+\mu_b[d(n+j)e(n+j)], j=1, \ldots, N \quad \text{Eq. (2)}$$

where $b_j(n)$ are the coefficients of the equalizer 111 in time domain (that is, the coefficients utilized by the equalizer when performing filtering in time domain), $c_i(n)$ are the coefficients of the equalizer 112 in time domain, n is the time index of the sampling time n, j is the tap index of the equalizer 111, i is the tap index of the equalizer 112, N is the tap number of the equalizer 111, (N+K) is the tap order of the equalizer 112, $\mu_c$ is the weighting utilized for adjusting the coefficients $c_i(n)$, and $\mu_b$ is the weighting utilized for adjusting the coefficients $b_j(n)$.

Figure 2:
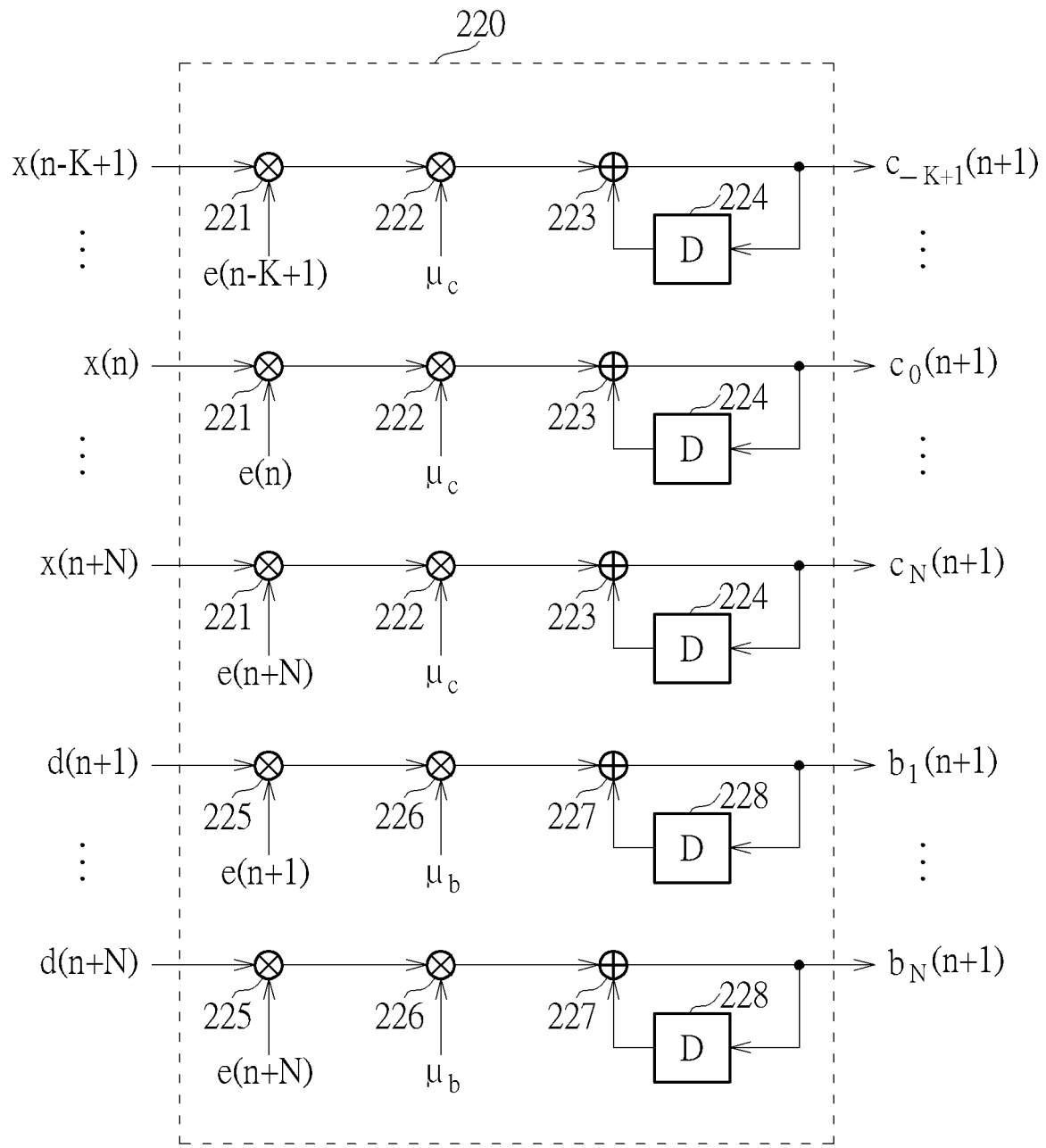
FIG. 2 is an exemplary block diagram of the coefficient adjusting circuit according to the first embodiment of the invention.

FIG. 2 is an exemplary block diagram of the coefficient adjusting circuit according to a first embodiment of the invention. As shown in FIG. 2, the coefficient adjusting circuit 220 may comprise a plurality of multipliers (such as the multipliers 221, 222, 225 and 226), a plurality of combiners (such as the combiners 223 and 227), and a plurality of delay circuits (such as the delay circuits 224 and 228), and is configured to generate the coefficients $c_i(n+1)$ and $b_j(n+1)$ according to the error signal e(n), the decision signal d(n), the input signal x(n) and the feedback coefficients $c_i(n)$ and $b_j(n)$.

According to the first embodiment of the invention, besides the aforementioned adaptive adjustment, in response to a control signal constrain_en, a limit operation of the coefficients $b_j(n)$ of the equalizer 111 may be selectively performed. When the limit operation is performed, at least one of the coefficients $b_j(n)$ is set to a predetermined value to generate a set of limited coefficients. The limit operation performed on the coefficients $b_j(n)$ is illustrated in the following equation Eq. (3):

$$b_1(n)=p_1, b_2(n)=p_2, \ldots, b_M(n)=p_M \quad \text{Eq. (3)}$$

where M<=N and the predetermined values $p_1, p_2, \ldots, p_M$ are predesigned constants.

Figure 3:
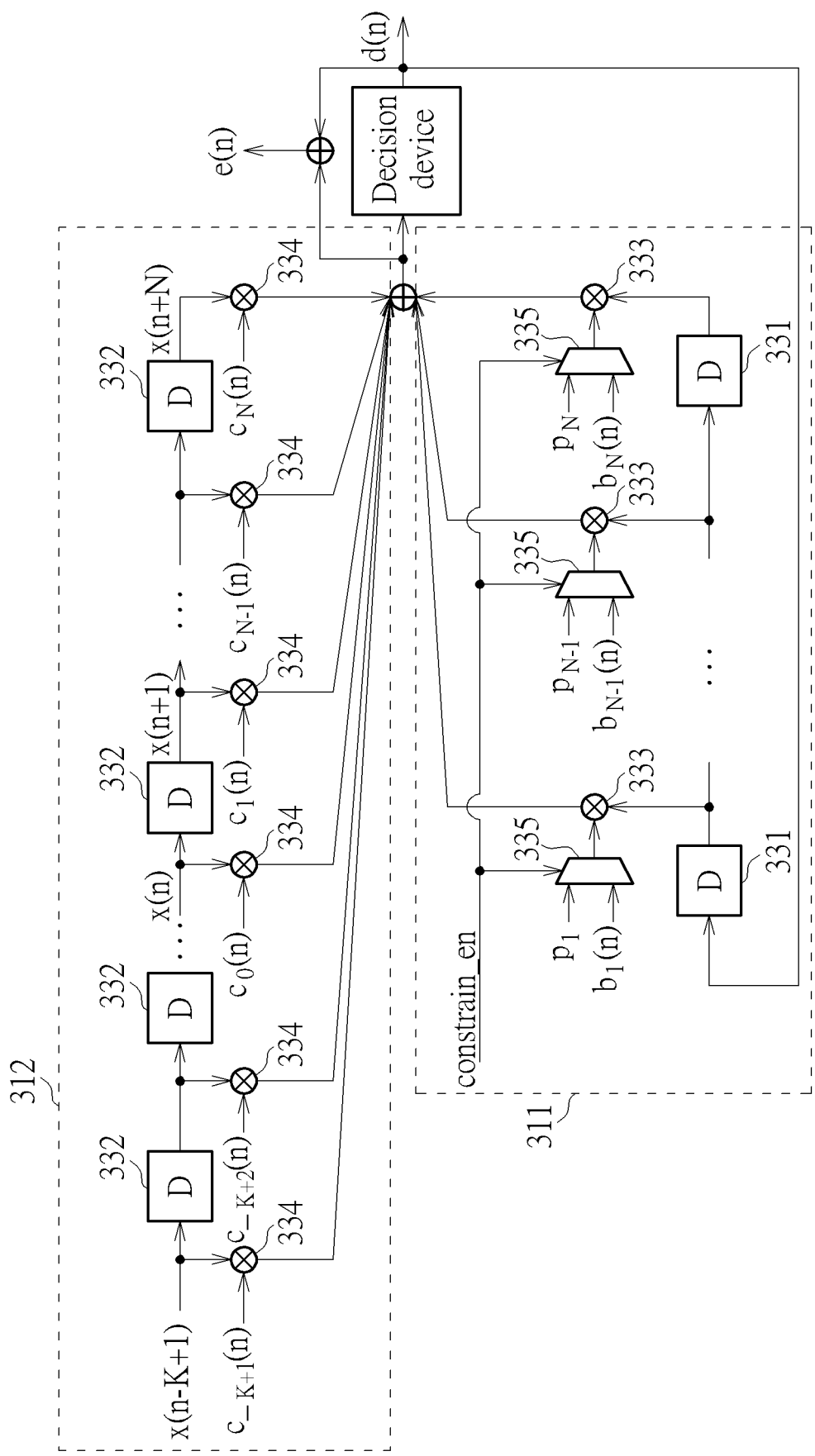
FIG. 3 is a block diagram of a portion of the signal processing device according to the first embodiment of the invention.

FIG. 3 is a block diagram of a portion of the signal processing device according to the first embodiment of the invention, for illustrating the filtering operation of the equalizer and the limit operation of the coefficient $b_j(n)$. In the first embodiment, the equalizer 111/311 is a feedback equalizer (FBE), the equalizer 112/312 is a feedforward equalizer (FFE) and the equalizers 111/311 and 112/312 perform filtering in time domain. As shown in FIG. 3, the filtering operations in time domain may be performed by delaying the signals x(n) and d(n) by the delay circuits 331 and 332 to generate the corresponding delayed signals and multiplying the signals and the corresponding coefficients $c_{-K+1}(n)$, $c_{-K+2}(n) \ldots c_0(n), c_1(n) \ldots c_{N-1}(n), c_N(n)$ and $b_1(n) \ldots b_{N-1}(n), b_N(n)$ or the limited coefficients $p_1, p_{N-1}, \ldots, p_N$ together by the multipliers 333 and 334.

As shown in FIG. 3, the equalizer 311 may comprise a plurality of multiplexers 335. The multiplexer 335 is configured to select one of the coefficients $b_j(n)$ and $p_j$, and output the selected one to the multiplier 333 in response to the control signal constrain_en generated by an external device. According to another embodiment of the invention, a limit operation of the coefficients of the FFE equalizer (e.g. the equalizer 112/312) may be selectively performed during a procedure of adaptively adjusting one or more of the coefficients of the FFE equalizer, and when the limit operation of the coefficients of the FFE equalizer is performed, at least one of the coefficients of the FFE is further adjusted according to a weakening factor during the procedure of adaptively adjusting the one or more of the coefficients of the FFE equalizer to generate a set of limited coefficients of the FFE equalizer.

Figure 4:
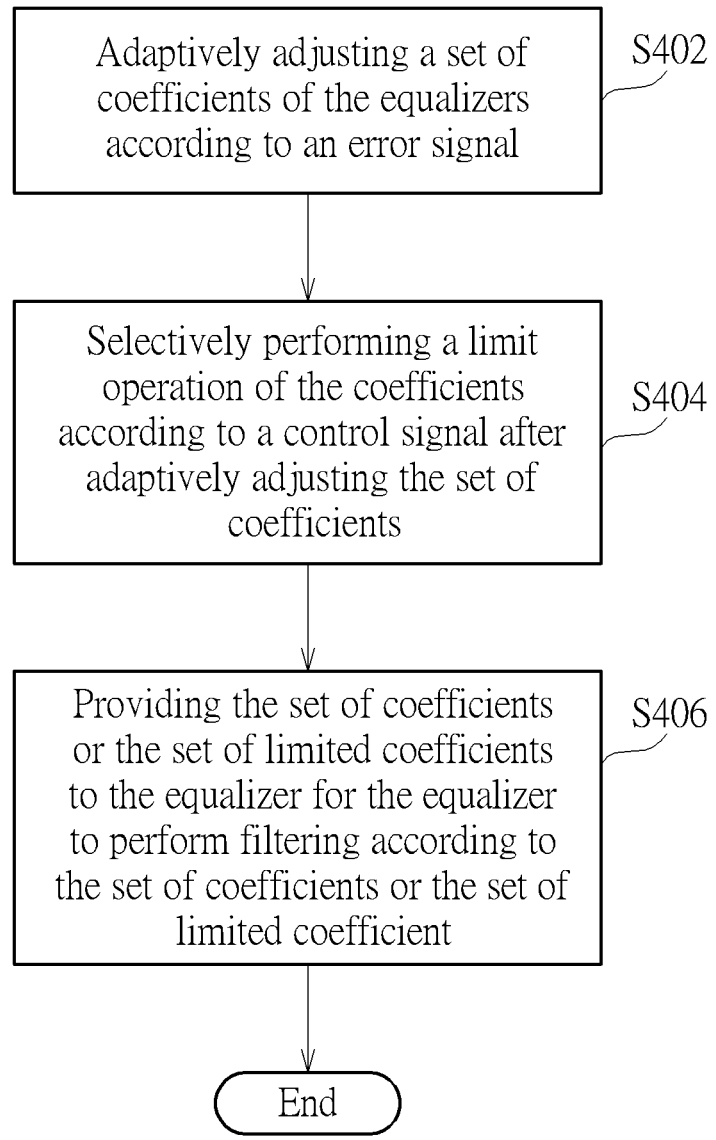
FIG. 4 is an exemplary flow chart of a signal processing method according to the first embodiment of the invention.

FIG. 4 is an exemplary flow chart of a signal processing method according to the first embodiment of the invention.

The signal processing method may be performed by the signal processing devices as shown in FIG. 1~FIG. 3 and comprise the following steps:

Step S402: adaptively adjusting a set of coefficients of the equalizers according to an error signal, such as the adaptive adjustment performed by the coefficient adjusting circuit 120/220 as illustrated in equations Eq. (1) and Eq. (2) and FIG. 2.

Step S404: after adaptively adjusting the set of coefficients, selectively performing a limit operation of the coefficients according to a control signal. When the limit operation of the coefficients is not performed, the set of coefficients are not adjusted. When the limit operation of the coefficients is performed, one or more coefficients $b_j(n)$ among the coefficients $b_1(n)\sim b_N(n)$ is/are set to the predetermined value $p_j$, and the set of limited coefficients is generated. As shown in Eq. (3) and FIG. 3, one of the coefficients $b_j(n)$ and $p_j$ is output to the corresponding multiplexer according to the control signal constrain_en.

Step S406: providing the set of coefficients (when the limit operation of the coefficients is not performed) or the set of limited coefficients (when the limit operation of the coefficients is performed) to the equalizer for the equalizer to perform filtering according to the set of coefficients or the set of limited coefficient. As shown in FIG. 3, the multiplexers 335 are configured to output the corresponding coefficients provided for the filtering operation.

In the first embodiment of the invention, the limited operation is performed on the coefficients in time domain. By setting the $1^{st}\sim M^{th}$ tap (order) coefficients of the equalizer 111/311 to the predesigned constants via the limit operation, the frequency response of the equalizer 112/312 has a weakened gain in a specific frequency band. Since the frequency response of the equalizer 111/311 and the frequency response of the equalizer 112/312 are mutually related, when the $1^{st}\sim M^{th}$ tap coefficients of the equalizer 111/311 are reshaped via the limit operation, the frequency response of the equalizer 112/312 may be changed as well due to the reshape of the coefficients of the equalizer 111/311 even if the coefficients of the equalizer 112/312 are not changed. Suppose that the equalizer 112/312 has a first frequency response when the equalizer 111/311 performs filtering operations according to the coefficients that have not been reshaped (that is, according to the adaptively adjusted coefficients). When the equalizer 111/311 performs filtering operations according to the reshaped or limited coefficients (that is, one or more coefficients are set to predetermined value $p_j$), the equalizer 112/312 has a second frequency response. Compared to the first frequency response, the second frequency response has a weakened gain in a specific frequency band.

Figure 5:
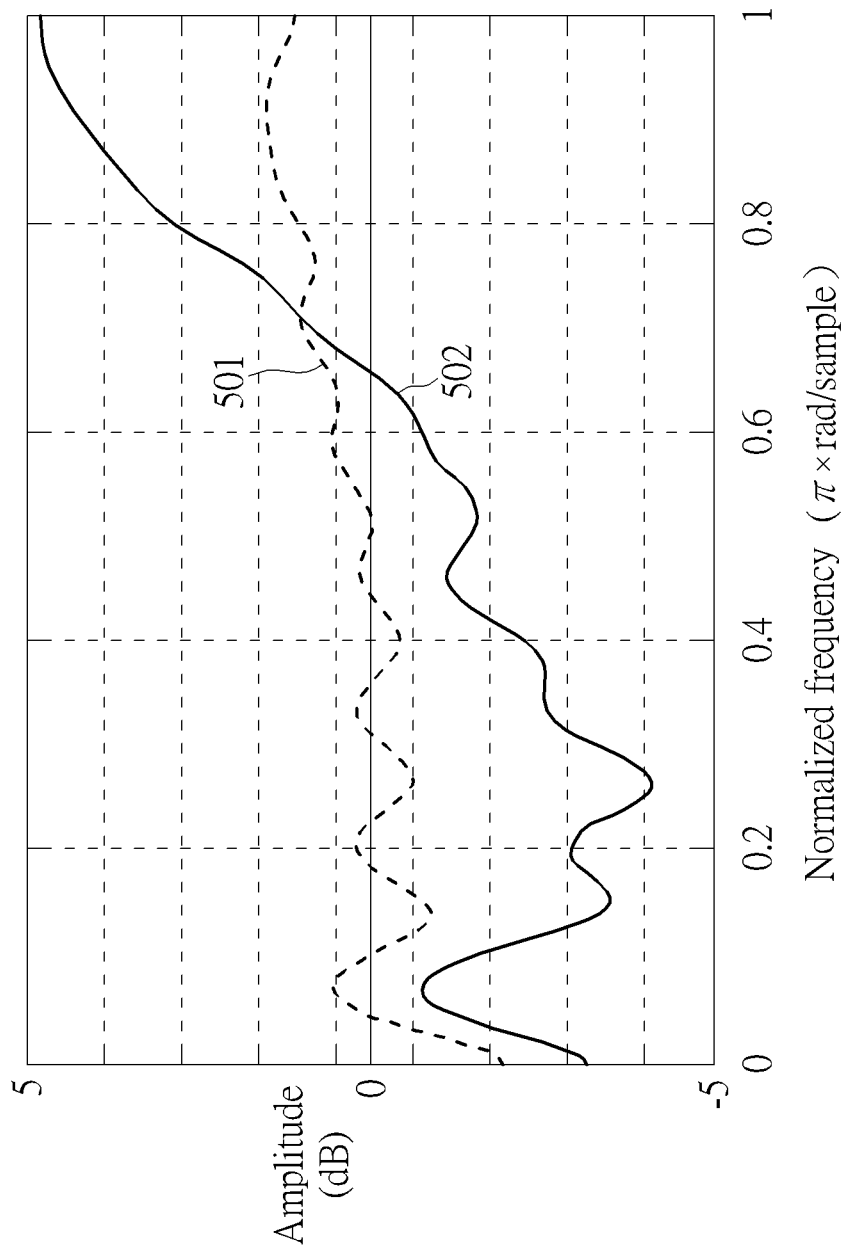
FIG. 5 is an exemplary frequency response according to the first embodiment of the invention.

FIG. 5 is an exemplary frequency response according to the first embodiment of the invention. The frequency response curve 501 represents the frequency response of the equalizer 112/312 obtained when the equalizer 111/311 performs filtering according to the set of coefficients that have not been reshaped. The frequency response curve 502 represents the frequency response of the equalizer 112/312 obtained when the equalizer 111/311 performs filtering according to the set of coefficients that have been reshaped/limited. As shown in FIG. 5, comparing to the frequency response curve 501, in the frequency response curve 502, a weakened gain is presented in the normalized frequency band 0~0.7 (π*rad/sample), wherein the normalized frequency may be obtained by dividing the frequency by the sampling frequency.

According to an embodiment of the invention, the limit (reshape) operation of the coefficients may be performed during a procedure of adaptively adjusting the coefficients (that is, the adaptive training procedure), and may also be performed after the adaptive training. For example, the coefficients of the equalizers 111/311 and 112/312 may be adaptively adjusted according to the error signal e(n) during the adaptive training procedure, so as to minimize the error signal e(n). After the adaptive training procedure is complete, the optimized coefficients of the equalizers 111/311 and 112/312 may be obtained. After obtaining the optimized coefficients, the limit operation may be performed on the coefficients of the feedback equalizer in time domain according to the first embodiment of the invention, wherein the constants $p_1, p_2, \ldots, p_M$ may be predesigned according to the value of the gain that has to be weakened. In this manner, even if the coefficients of the feed-forward equalizer are not adjusted, by limiting the coefficients of the feedback equalizer, the frequency response of the feed-forward equalizer can still be accordingly changed and the result of weakening the gain can be achieved.

Figure 6:
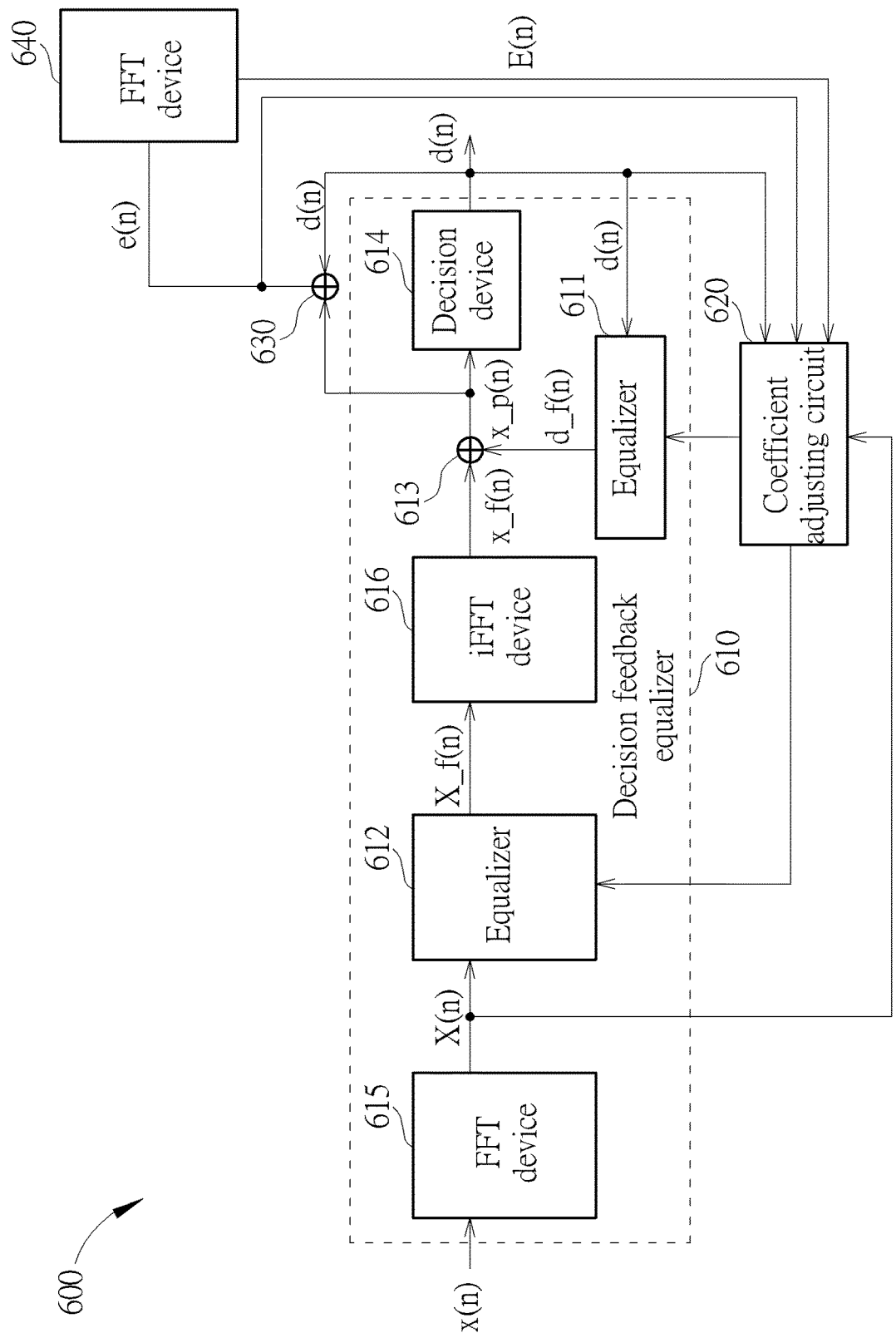
FIG. 6 is an exemplary block diagram of a signal processing device according to a second embodiment of the invention.

FIG. 6 is an exemplary block diagram of the signal processing device according to a second embodiment of the invention. The signal processing device 600 is applicable for a communication device, such as a receiver in a communication system, and is configured for processing the received signals. The signal processing device 600 may comprise a decision feedback equalizer 610 and a coefficient adjusting circuit 620. The decision feedback equalizer 610 may comprise equalizers 611 and 612, a combiner 613 and a decision device 614. The equalizer 611 is configured to perform filtering on the signal d(n) according to a set of first coefficients to generate the filtered signal d_f(n). The set of first coefficients comprises a plurality of first coefficients. The signal d(n) is an output signal (or called the decision signal) of the decision device 614. The equalizer 612 is configured to perform filtering on the signal X(n) according to a set of second coefficients to generate the filtered signal X_f(n). The set of second coefficients comprises a plurality of second coefficients.

In the second embodiment, the signal processing device 600 or the decision feedback equalizer 610 may further comprise a fast Fourier transform (FFT) device 615 and an inverse fast Fourier transform (IFFT) device 616. The FFT device 615 is configured to perform FFT on the time domain signal x(n) to generate the frequency domain signal X(n), where the time domain signal x(n) may be an input signal of the signal processing device 600, or, the received signal of the receiver. The IFFT device 616 is configured to perform IFFT on the frequency domain signal (the filtered signal) X_f(n) to generate an output signal x_f(n). The output signal x_f(n) is the time domain signal. The combiner 613 is coupled to the equalizer 611 and the IFFT device 616 and configured to combine the signal x_f(n) and the signal d_f(n) to generate a processed signal x_p(n). The decision device 614 may be a slicer and is configured to generate a decision signal d(n) according to the processed signal x_p(n).

The signal processing device 600 may further comprise another combiner 630 and the FFT device 640. The combiner 630 is coupled to the combiner 613 and the decision device 614 and is configured to combine the processed signal x_p(n) and the decision signal d(n), for example, by subtracting one from another, to generate the error signal e(n). The FFT device 640 is configured to perform FFT on the time domain error signal e(n) to generate the frequency domain error signal E(n).

The coefficient adjusting circuit 620 is configured to adaptively adjust one or more of the first coefficients or one or more of the second coefficients according to the error signals e(n) and E(n), the decision signal d(n) and the input signal x(n). The operations of adaptive coefficient adjustment performed by the coefficient adjusting circuit 620 are illustrated in the following equations Eq. (4) and Eq. (5):

$$C_k(n+1)=(1-\alpha_i*\text{leaky\_on}_i)*C_k(n)+\mu_c*X_k(n)E_k(n), i=1,\ldots,P \quad \text{Eq. (4)}$$

$$b_j(n+1)=b_j(n)+\mu_b[d(n+j)e(n+j)], j=1,\ldots,N \quad \text{Eq. (5)}$$

$$X_k(n)=\text{FFT}[x(n)], k=1,2,\ldots,K \quad \text{Eq. (6)}$$

$$E_k(n)=\text{FFT}[e(n)] \quad \text{Eq. (7)}$$

where $b_j(n)$ are the coefficients of the equalizer 611 in time domain, $C_k(n)$ are the coefficients of the equalizer 612 in frequency domain (that is, the coefficients utilized by the equalizer when performing filtering in frequency domain), n is the time index of the sampling time n, j is the tap index of the equalizer 611, N is the tap number of the equalizer 111, k is the index in frequency domain, K is the number of points of the FFT performed by the FFT device 640, $\mu_c$ is the weighting utilized for adjusting the coefficients $C_k(n)$, $\mu_b$ is the weighting utilized for adjusting the coefficients $b_j(n)$, $X_k(n)$ is the result obtained by performing FFT on the signal x(n) and $E_k(n)$ is the result obtained by performing FFT on the signal e(n).

In the second embodiment of the invention, the limit (reshape) operation of the coefficients $C_k(n)$ may be selectively performed during the adaptively adjusting procedure according to the switch signal leaky\_on$_i$, wherein the coefficients $C_k(n)$ may further be divided into a plurality of groups, a unit for controlling the limit (reshape) operation of the coefficients $C_k(n)$ may be one group, i is the group index, P is the total number of groups, the value of the switch signal leaky\_on$_i$ may be set to 0 or 1, $\alpha_i$ is the weakening factor and $0<\alpha_i<1$. For example, when the switch signal leaky\_on$_i$ is set to 1, the coefficients $C_k(n)$ belonging to the $i^{th}$ group are further adjusted according to the weakening factor $\alpha_i$ during the adaptively adjusting procedure to generate a set of limited coefficients. When the switch signal leaky\_on$_i$ is set to 0, the coefficients $C_k(n)$ belonging to the $i^{th}$ group are not further adjusted according to the weakening factor $\alpha_i$ during the adaptively adjusting procedure.

Figure 7:
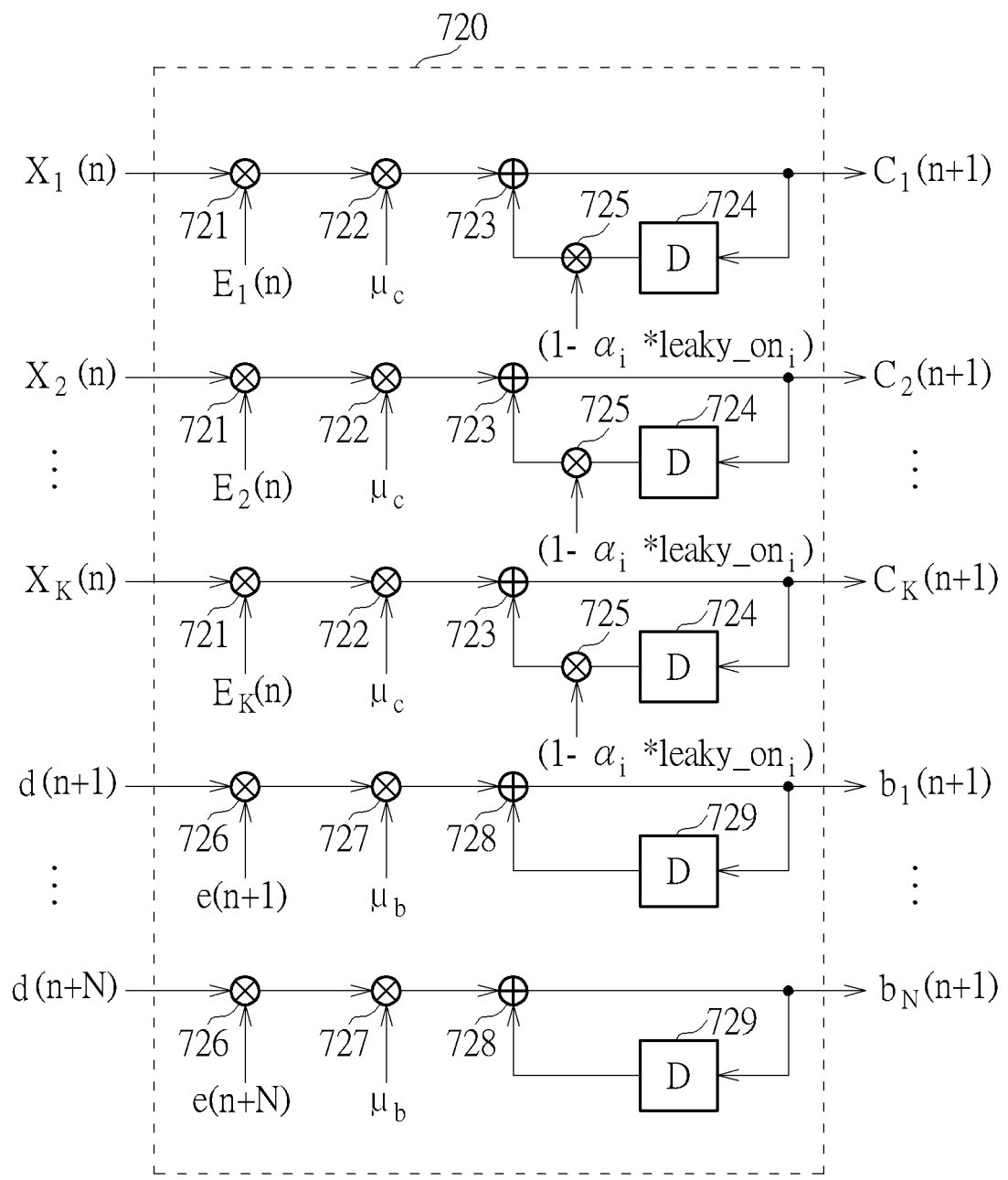
FIG. 7 is an exemplary block diagram of the coefficient adjusting circuit according to the second embodiment of the invention.

FIG. 7 is an exemplary block diagram of the coefficient adjusting circuit according to the second embodiment of the invention. As shown in FIG. 7, the coefficient adjusting circuit 720 may further comprise a plurality of multipliers (such as the multipliers 721, 722, 725, 726 and 727), a plurality of combiners (such as the combiners 723 and 728) and a plurality of delay circuits (such as the delay circuits 724 and 729), and is configured to generate the coefficients $C_k(n+1)$ and $b_j(n+1)$ according to the error signals e(n) and $E_k(n)$, the decision signal d(n), the input signal $X_k(n)$ and the feedback coefficients $C_k(n)$ and $b_j(n)$.

For example, suppose that the FFT device 640 performs 16-points FFT, that is, K=16, the equalizer 612 has 16 taps of coefficients $C_k(n)$ in frequency domain. In addition, suppose that the total number of groups P=4, each group may comprise 4 coefficients. When the switch signal leaky\_on$_1$ is set to 1, the coefficients $C_1(n)$~$C_4(n)$ belonging to the first group are further adjusted according to the weakening factor $\alpha_1$ during the adaptively adjusting procedure as illustrated in equation Eq. (4), and the rest may be deduced by analogy.

Figure 8:
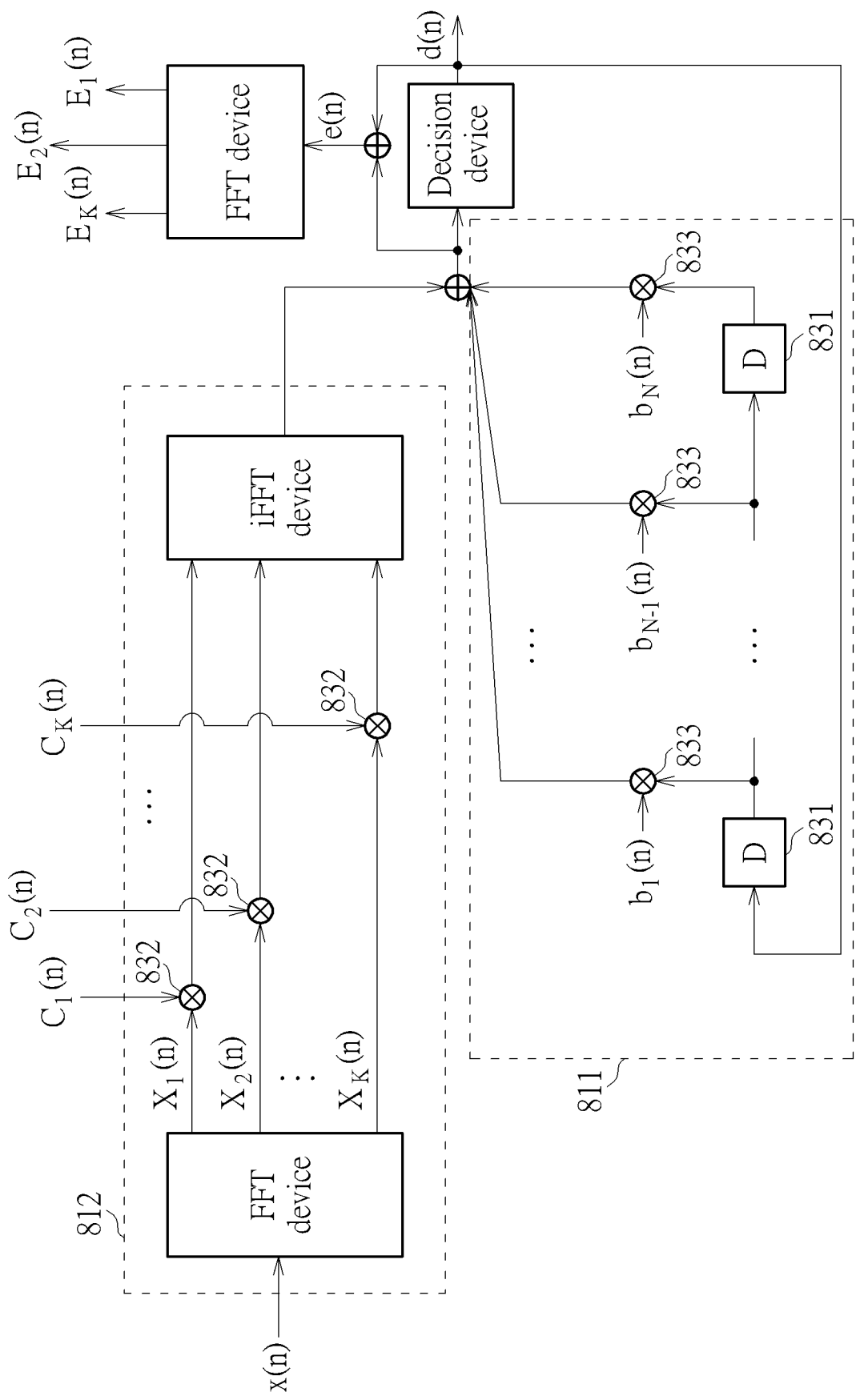
FIG. 8 is a block diagram of a portion of the signal processing device according to the second embodiment of the invention.

FIG. 8 is a block diagram of a portion of the signal processing device according to the second embodiment of the invention, for illustrating the filtering operation of the equalizer. In the second embodiment, the equalizer 611/811 is a feedback equalizer (FBE), the equalizer 612/812 is a feedforward equalizer (FFE), the equalizer 611/811 performs filtering in time domain and the equalizer 612/812 performs filtering in frequency domain. As shown in FIG. 8, the filtering operations in time domain may be performed by delaying the signal d(n) by the delay circuits 831 to generate the corresponding delayed signals and multiplying the signals and the corresponding coefficients $b_1(n) \ldots b_{N-1}(n)$, $b_N(n)$ together by the multipliers 833. On the other hand, the filtering operations in frequency domain may be performed by multiplying the input signal in frequency domain and corresponding coefficients $C_1(n), C_2(n) \ldots C_K(n)$ together by the multipliers 832.

Figure 9:
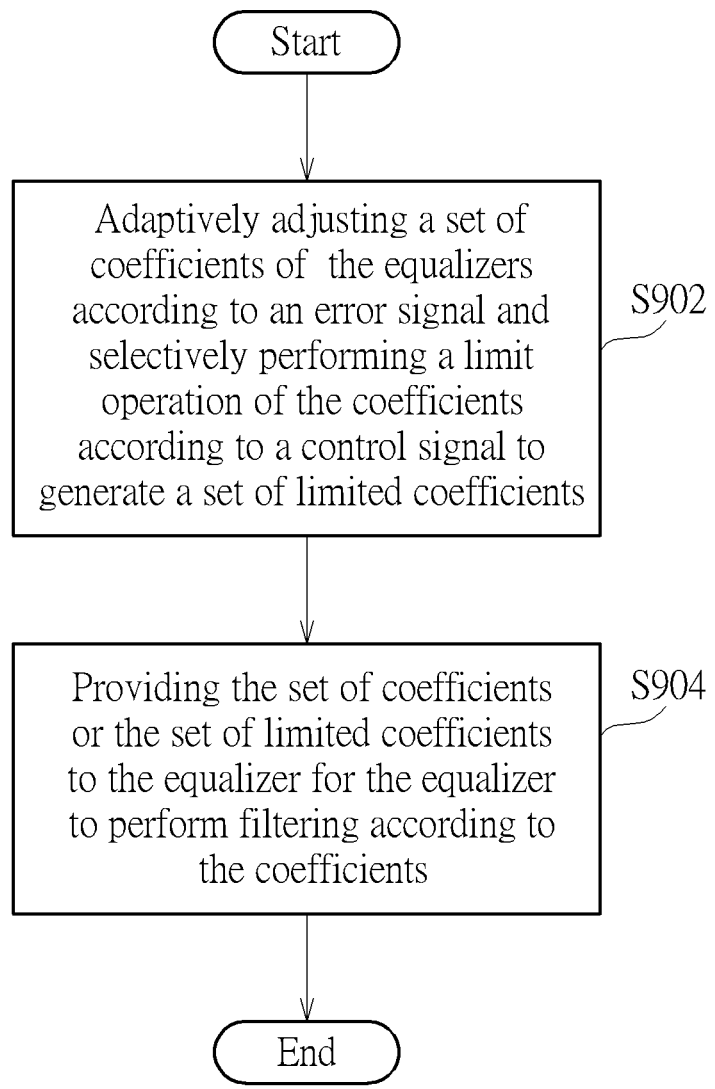
FIG. 9 is an exemplary flow chart of a signal processing method according to the second embodiment of the invention.

FIG. 9 is an exemplary flow chart of a signal processing method according to the second embodiment of the invention. The signal processing method may be performed by the signal processing devices as shown in FIG. 6~FIG. 8 and comprise the following steps:

Step S902: adaptively adjusting a set of coefficients of the equalizers according to an error signal, such as the adaptive adjustment in equations Eq. (4) and Eq. (5) and the adaptive adjustment performed by the coefficient adjusting circuit 620/720 shown in FIG. 7.

According to the second embodiment of the invention, step S902 may further comprise:

selectively performing a limit operation of the coefficients of the feed-forward equalizer (FFE) according to a control signal. When the limit operation of the coefficients is performed, at least one of the coefficients of the FFE is further adjusted according to a weakening factor to generate a set of limited first coefficients. As shown in the equation Eq. (4) and in FIG. 7, the limit (reshape) operation of the coefficient $C_k(n)$ may be selectively performed according to the switch signal leaky\_on$_i$ during the adaptive training procedure.

Step S904: providing the set of coefficients (when the limit operation is not performed) or the set of limited coefficients (when the limit operation is performed) to the equalizer for the equalizer to perform filtering according to the coefficients.

According to the second embodiment of the invention, the limit (reshape) operation of the feed-forward equalizer (FFE) is performed in frequency domain. By performing the limit operation to weaken one or more coefficients of the equalizer 612/812 according to the predesigned weakening factor, the frequency response of the equalizer 612/812 has a weakened gain in a specific frequency band. Suppose that the equalizer 612/812 has a first frequency response when the equalizer 612/812 performs filtering operations according to the coefficients that have not been reshaped (that is, according to the coefficients that have been adaptively adjusted but have not been weakened). When the equalizer 612/812 performs filtering operations according to the reshaped or limited coefficients (that is, according to the coefficients that have been adaptively adjusted and one or more of them have been weakened), the equalizer 612/812 has a second frequency response. Compared to the first frequency response, the second frequency response has a weakened gain in a specific frequency band.

Figure 10:
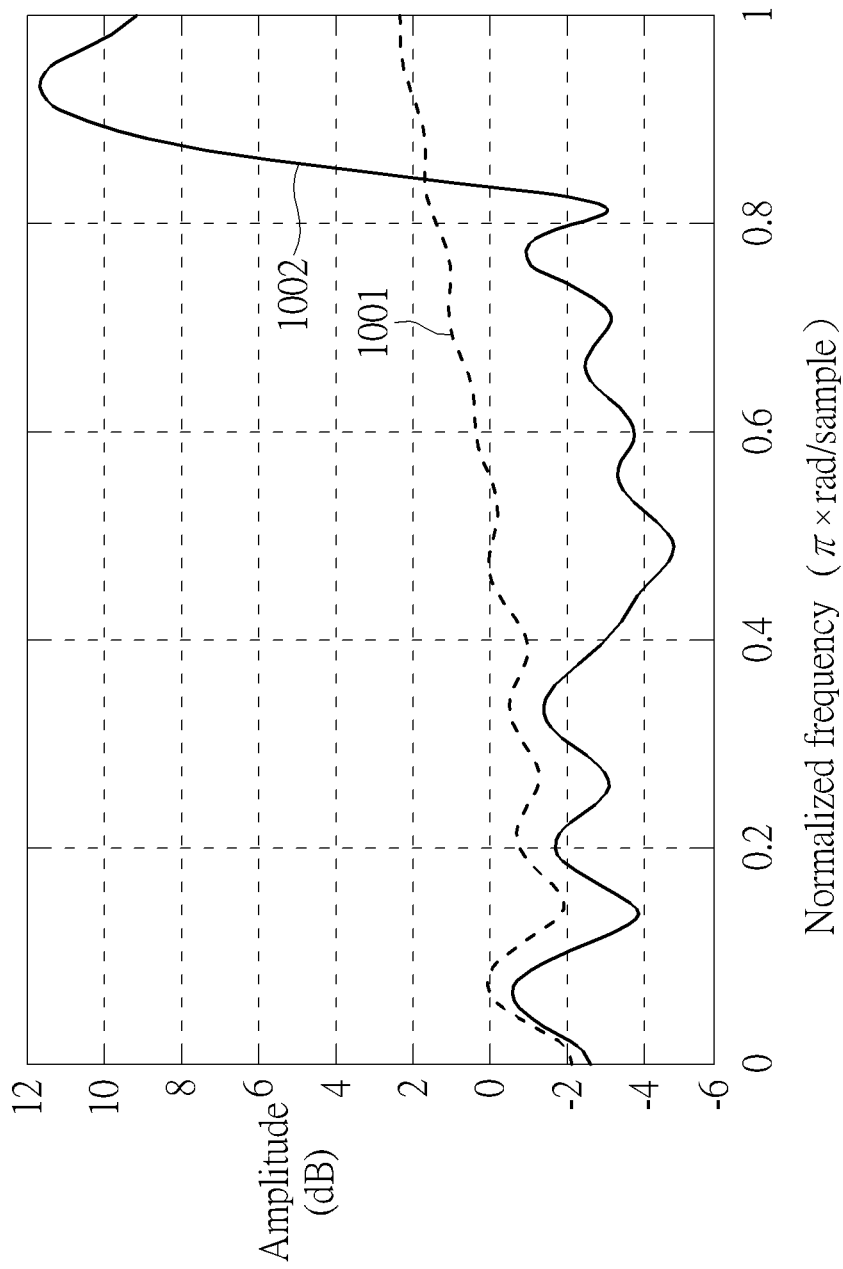
FIG. 10 is an exemplary frequency response according to the second embodiment of the invention.

FIG. 10 is an exemplary frequency response according to the second embodiment of the invention. The frequency response curve 1001 represents the frequency response of the equalizer 612/812 obtained when the equalizer 612/812 performs filtering according to the set of coefficients that have not been reshaped. The frequency response curve 1002 represents the frequency response of the equalizer 612/812 obtained when the equalizer 612/812 performs filtering according to the set of coefficients that have been reshaped/limited. As shown in FIG. 10, comparing to the frequency response curve 1001, in the frequency response curve 1002, a weakened gain is presented in the normalized frequency band 0~0.8 ($\pi$*rad/sample).

According to an embodiment of the invention, the aforementioned limit (reshape) operations of the coefficients may be performed during a procedure of adaptively adjusting the coefficients (that is, the adaptive training procedure), and may also be performed after the optimized coefficients are obtained. For example, the coefficients of the equalizers 611/811 and 612/812 may be adaptively adjusted according to the error signal e(n) during the adaptive training procedure, so as to minimize the error signal e(n). After the adaptive training procedure is complete, the optimized coefficients of the equalizers 611/811 and 612/812 may be obtained. After obtaining the optimized coefficients, the limit operation may be performed on the coefficients of the feed-forward equalizer in frequency domain according to the second embodiment of the invention, wherein the switch signal leaky_on$_i$ and the weakening factor $\alpha_i$ may be pre-designed according to the frequency range and the value of the gain that has to be weakened. In this manner, the frequency response of the feed-forward equalizer can be accordingly changed and the result of weakening the gain can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing device, comprising:
    a decision feedback equalizer, comprising:
        a first equalizer, configured to perform filtering on a first signal according to a set of first coefficients to generate a first filtered signal, wherein the set of first coefficients comprises a plurality of first coefficients; and
        a second equalizer, configured to perform filtering on a second signal according to a set of second coefficients to generate a second filtered signal, wherein the set of second coefficients comprises a plurality of second coefficients, and
    a coefficient adjusting circuit, configured to adaptively adjust one or more of the first coefficients according to an error signal,
    wherein a limit operation of the first coefficients is selectively performed, and when the limit operation of the first coefficients is performed, at least one of the first coefficients is set to a first predetermined value to generate a set of limited first coefficients, and when the first equalizer performs filtering according to the set of limited first coefficients, the second equalizer has a specific frequency response with a weakened gain in a specific frequency band, and
    wherein the coefficient adjusting circuit is further configured to adaptively adjust one or more of the second coefficients according to the error signal, and a limit operation of the second coefficients is selectively performed during a procedure of adaptively adjusting the one or more of the second coefficients, and wherein when the limit operation of the second coefficients is performed, at least one of the second coefficients is further adjusted according to a weakening factor during the procedure of adaptively adjusting the one or more of the second coefficients to generate a set of limited second coefficients.

2. The signal processing device of claim 1, wherein the first equalizer is a feedback equalizer and the second equalizer is a feed-forward equalizer.

3. The signal processing device of claim 1, wherein the decision feedback equalizer further comprises:
    a first combiner, coupled to the first equalizer and the second equalizer and configured to combine the first filtered signal and the second filtered signal to generate a processed signal;
    a decision device, configured to generate a decision signal according to the processed signal; and
    a second combiner, coupled to the first combiner and the decision device and configured to combine the processed signal and the decision signal to generate the error signal.

4. The signal processing device of claim 1, wherein the set of second coefficients and the set of limited second coefficients are coefficients of the second equalizer in frequency domain.

5. The signal processing device of claim 1, wherein after the limit operation of the second coefficients is performed, a frequency response corresponding to the set of limited second coefficients has a weakened gain in a specific frequency band.

6. The signal processing device of claim 1, further comprising:
    a fast Fourier transform (FFT) device, coupled to the second equalizer and configured to perform FFT on an input signal to generate the second signal; and
    an inverse fast Fourier transform (IFFT) device, coupled to the second equalizer and configured to perform IFFT on the second filtered signal to generate an output signal.

7. The signal processing device of claim 6, further comprising:
    a first combiner, coupled to the first equalizer and the IFFT device and configured to combine the first filtered signal and the output signal to generate a processed signal;
    a decision device, configured to generate a decision signal according to the processed signal; and
    a second combiner, coupled to the first combiner and the decision device and configured to combine the processed signal and the decision signal to generate the error signal.

* * * * *